United States Patent [19]

Wentler et al.

[11] Patent Number: 5,654,871
[45] Date of Patent: Aug. 5, 1997

[54] MOTOR CONTROL CENTER PROVIDING PHASE CONDUCTOR ACCESS

[75] Inventors: Lloyd E. Wentler, Efland; Edgar Yee, Chapel Hill; Tomas Bienvenido Reyes, Durham; Kevin F. Nolan, Hillsborough, all of N.C.

[73] Assignee: General Electric Company, New York, N.Y.

[21] Appl. No.: 570,066

[22] Filed: Dec. 11, 1995

[51] Int. Cl.$^6$ ................................................. H02B 1/04
[52] U.S. Cl. ........................... 361/622; 361/614; 439/145
[58] Field of Search .......................... 312/223.1, 257.1; 174/67, 88 B; 439/113, 114, 135, 136, 145, 207; 361/608, 611, 614–617, 622, 623, 643, 641, 648, 724, 727

[56] References Cited

U.S. PATENT DOCUMENTS

| | | | |
|---|---|---|---|
| 3,628,098 | 12/1971 | Sturdivan | 317/120 |
| 4,090,230 | 5/1978 | Fuller | 361/617 |
| 4,272,798 | 6/1981 | Merda | 361/345 |
| 4,395,602 | 7/1983 | Castonguay | 200/50 AA |
| 4,688,144 | 8/1987 | Kleinecke | 361/617 |
| 5,148,348 | 9/1992 | White | 361/641 |

FOREIGN PATENT DOCUMENTS

| | | | |
|---|---|---|---|
| 0447381 | 9/1981 | European Pat. Off. | H02B 1/38 |
| 121943 | 9/1979 | Japan | 361/617 |
| 0801919 | 9/1958 | United Kingdom . | |
| 2157086 | 10/1985 | United Kingdom | H05K 5/00 |

*Primary Examiner*—Gerald P. Tolin
*Attorney, Agent, or Firm*—Richard A. Menelly; Carl B. Horton

[57] ABSTRACT

A motor control center of the type including a short circuit protective device such as a circuit breaker or fusible disconnect, and a motor starter for interacting with an electric motor includes a wiring access cabinet at the top of the control center. The multi-phase conductors within the access cabinet are protected by means of a pair of slidably-arranged access doors. The doors are arranged in a different position along the front of the access cabinet to access each of the individual phase conductors.

11 Claims, 4 Drawing Sheets

MOTOR CONTROL CENTER PROVIDING PHASE CONDUCTOR ACCESS

BACKGROUND OF THE INVENTION

Motor control centers are used with industrial-rated electric motors to start, control and protect the electric motor and associated electric circuit. One example of a motor control center containing motor starters to start and stop the motor along with circuit breakers to protect the electric motor and electric wiring is described in U.S. Pat. No. 3,628,098 entitled "Cabinet for Electrical Controls with Enclosed Bus Bars and Opposed Doors".

The associated electric phase conductors connecting with the control center components are arranged at the rear of the control center enclosure, and accessed by means of a cabinet positioned at the top of the enclosure. The doors to the cabinet are metal and additional electrical insulation is interfaced between the metal doors and the phase conductors to prevent inadvertent contact between the operator, the phase conductors and the door when the phase conductors are being installed and connected. To prevent inadvertent contact between the individual phases per se, separate electrical insulation is often installed between the individual phase conductors when such metal doors are used. In some control center designs, the inter-phase insulation is first removed to access the phase conductors and is later re-installed when such connections are completed.

It would be economically advantageous as well as less time consuming if such insulation could be avoided without deterring from the safe good electrical isolation requirements between the access doors and the individual phase conductors.

One purpose of the invention is to provide an upper phase conductor access cabinet to electric motor control centers and the like without requiring the use of electrical insulation between the access doors or between the phase conductors, while maintaining a safe environment to an operator while making electrical connections with the phase conductors.

SUMMARY OF THE INVENTION

A motor control center of the type containing an electric motor starter and a short circuit protective device for interacting with a remote electric motor, which includes an upper cabinet for access to the electric phase conductors connecting with the electrical distribution system as well as the electric motors. A pair of insulating doors are slidably arranged on the front of the cabinet to allow connection, disconnection and inspection of the individual phase conductors. The positional relationship of the doors along the front of the cabinet determines the access to the individual phase conductors.

DESCRIPTION OF THE PREFERRED EMBODIMENT

Figure 1:
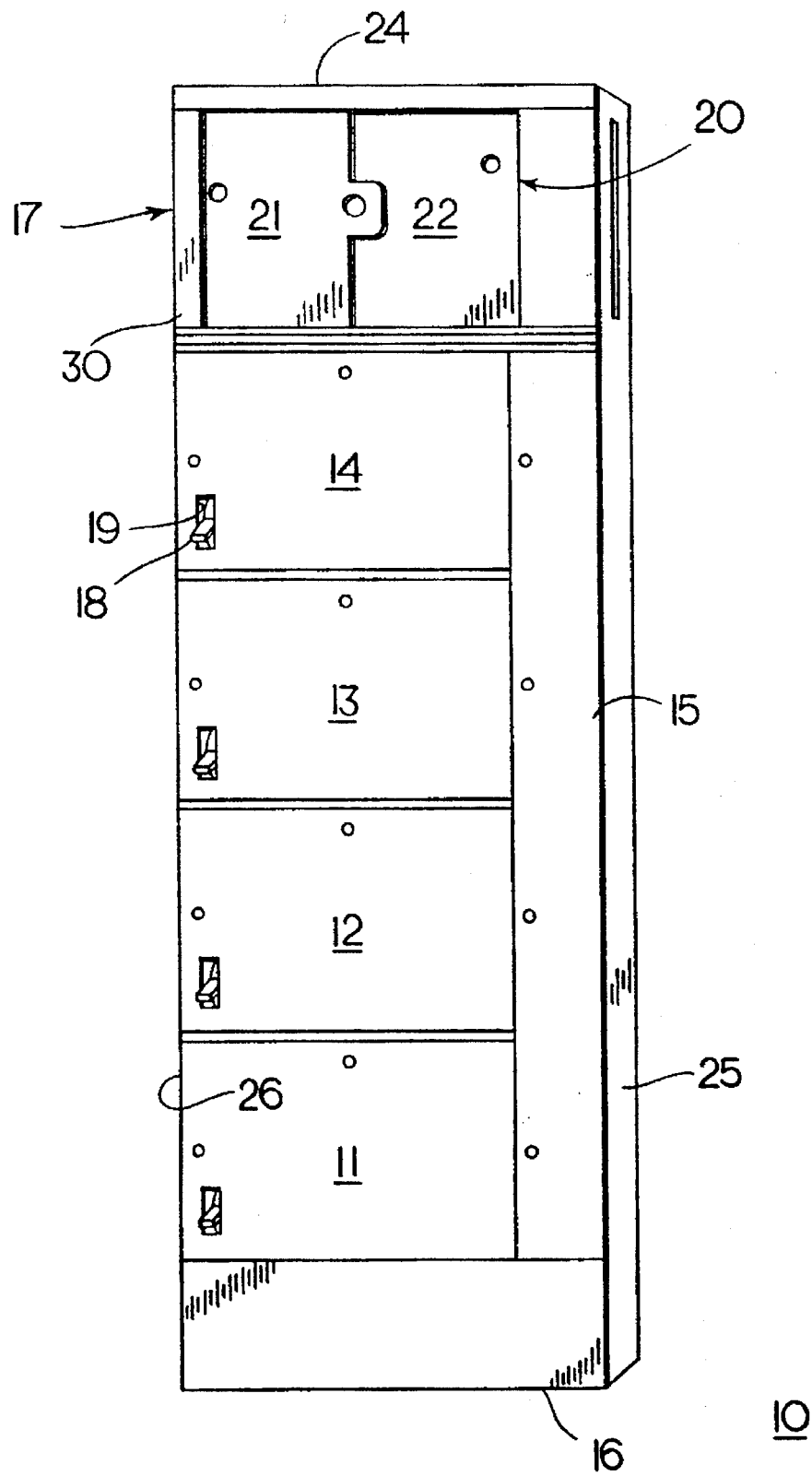
FIG. 1 is a front perspective view of a motor control center containing the phase conductor access cabinet in accordance with the invention.

A motor control center 10 similar to that described within the aforementioned U.S. Pat. No. 3,628,098 is shown in FIG. 1 and includes enclosures 11–14, each containing electrical components that are accessed by means of the handles 18 extending through the door slots 19. The control center is closed at the top by means of a top metal cover 24, at the bottom by means of the bottom metal plate 16, and at the sides by means of the opposing metal side walls 25, 26. In according with the teachings of the invention, a top cabinet 17 that contains the connections of the electrical distribution system with the vertical phase busses 28A–28C of FIG. 3 including an access door 20 to which access is made to the vertical phase busses by means of a pair of slidably-mounted left and right panels 21, 22. The door frame 30 that supports the panels as well as the panels per se, are fabricated from an electrically-insulating thermoplastic polymer material such as LEXAN, which is a trademark of General Electric Company for a polycarbonate resin. Wiring between the internal components and the associated electric circuit is provided by means of the wireway 15 extending from the bottom metal plate 16 to the top cabinet 17.

Figure 2:
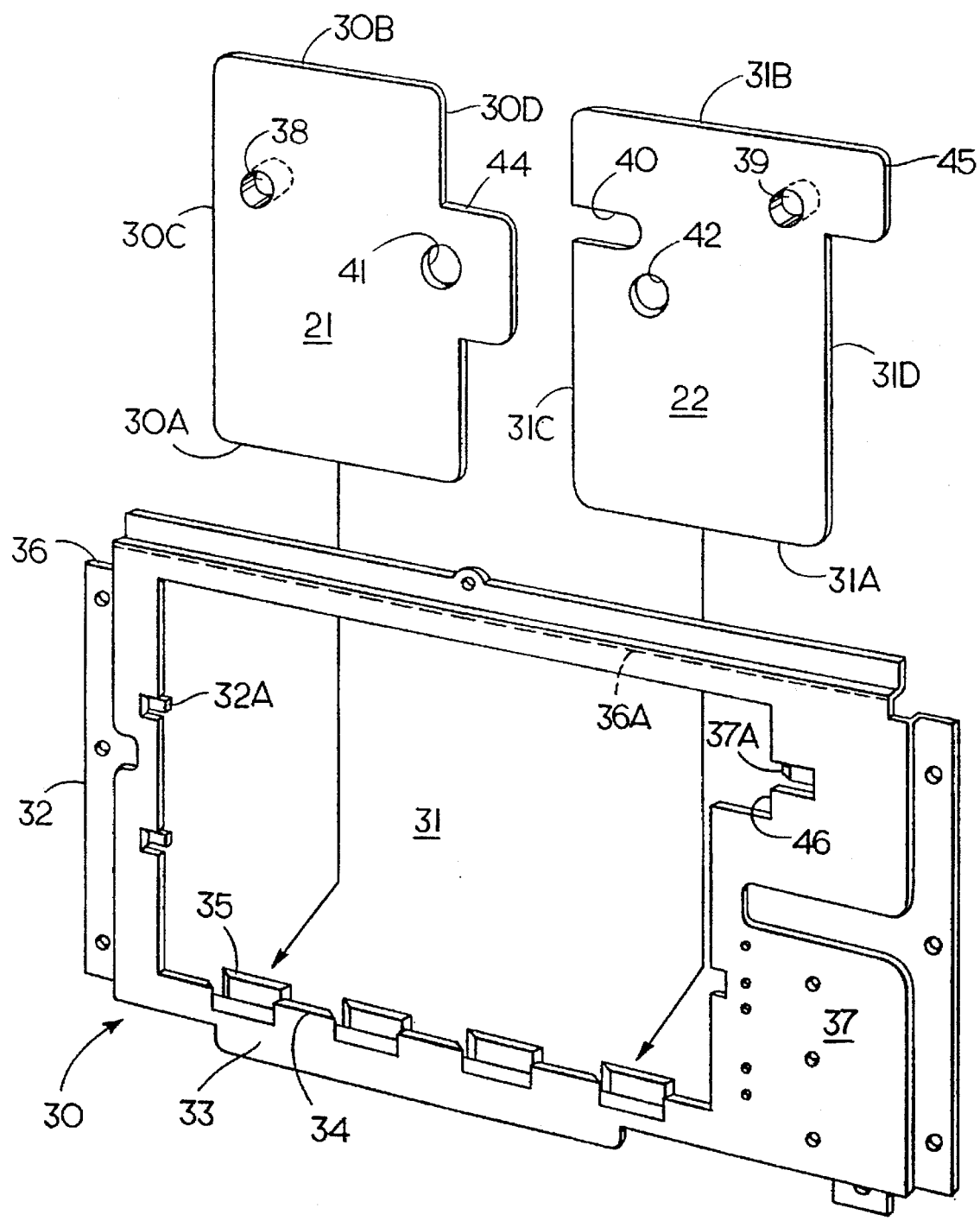
FIG. 2 is a front perspective view of door within the motor control center of FIG. 1 with the two door panels in isometric projection.

The door 20 for providing external access to the is depicted in FIG. 2 prior to assembly of the left panel 21 and the right panel 22 to the support frame 30. The panels are received and supported on their bottom edges 30A, 31A on the bottom rail 33 between upstanding front and rear tabs 34,35. The top edges 30B, 31 B are trapped between the back surface of the top plate 36 as indicated at 36A to allow the panels to slide along the opening 31 defined within the frame 30. The left edge 30C of the left panel 21 stops against the pair of tabs 32A formed in the left side wall 32, and the right edge 31 D of the right side panel 22 stops against the pair of tabs 37A formed within the right side wall 37 as indicated. The rectangular slot 46 formed in the right side wall allows access to the vertical phase bus 28B and is blocked by the top tab extension 45 on the right panel 22 as will be described below in greater detail with reference to FIGS. 3 and 4C. The closed-ended cylinders 38, 39 formed in the panels 21, 22 provide digital access to an operator for moving the panels along the opening. The back part of the cylinder 38, shown in dotted lines, on panel 21 is received within the radial slot 40 formed within the left side edge 31C on panel 22, which allows both panels to move in unison in either direction along the opening 31. The thru holes 41, 42 formed in the panels 21, 22 respectively allow access to the vertical phase bus 28C as will be described below in greater detail with reference to FIGS. 3 and 4B.

Figure 3:
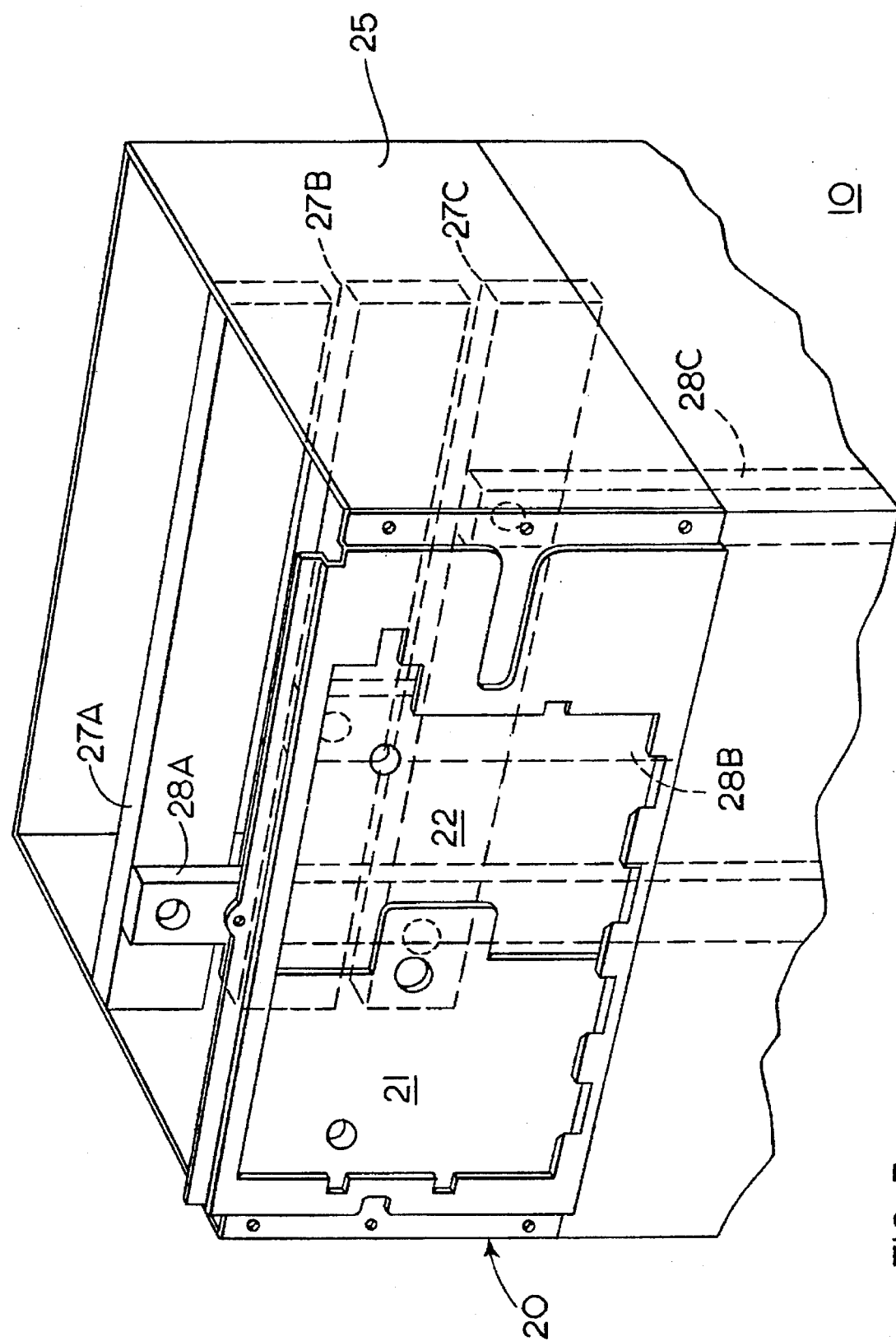
FIG. 3 is an enlarged top perspective view of the top part of the motor control center of FIG. 1, with the top of the control center and the door panels removed to depict the individual phase conductors.
Figure 4A:
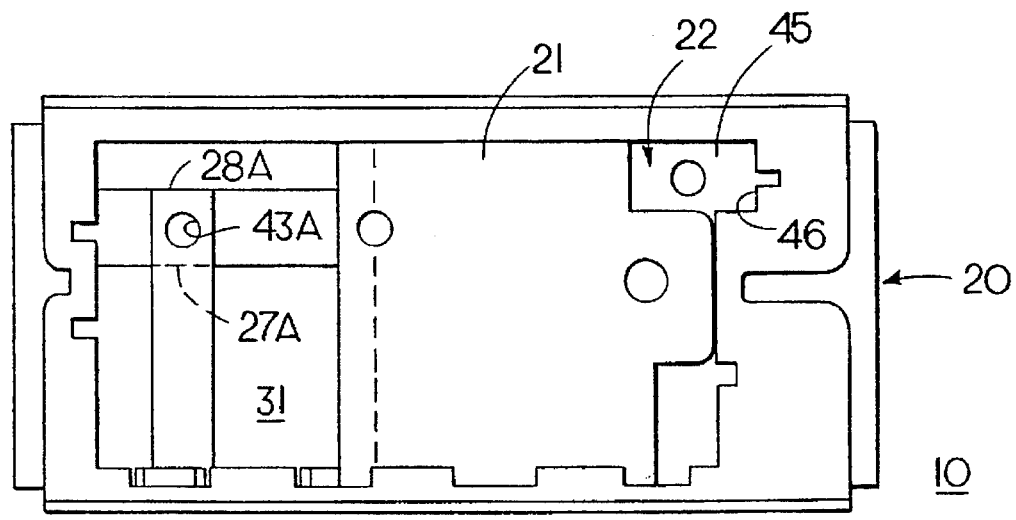
FIGS. 4A–4C are enlarged partial front plan views of the motor control center of FIG. 1, depicting the position of the door panels relative to the individual phase conductors.
Figure 4B:
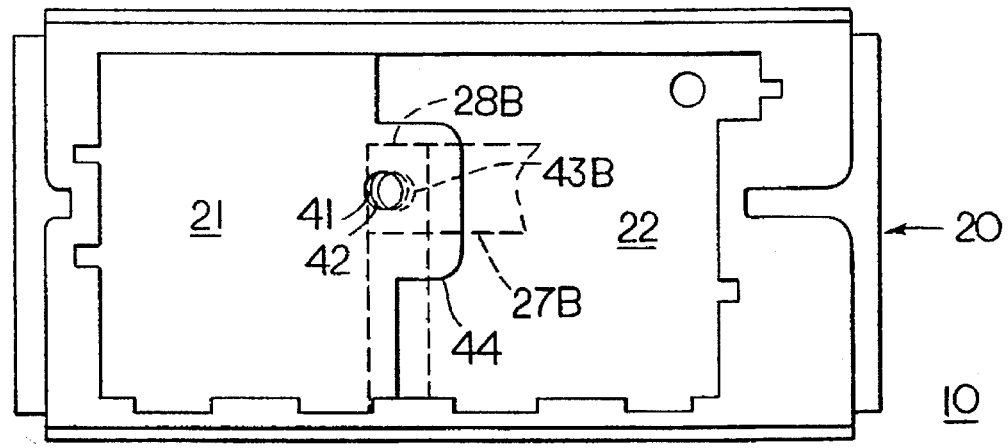
Figure 4C:
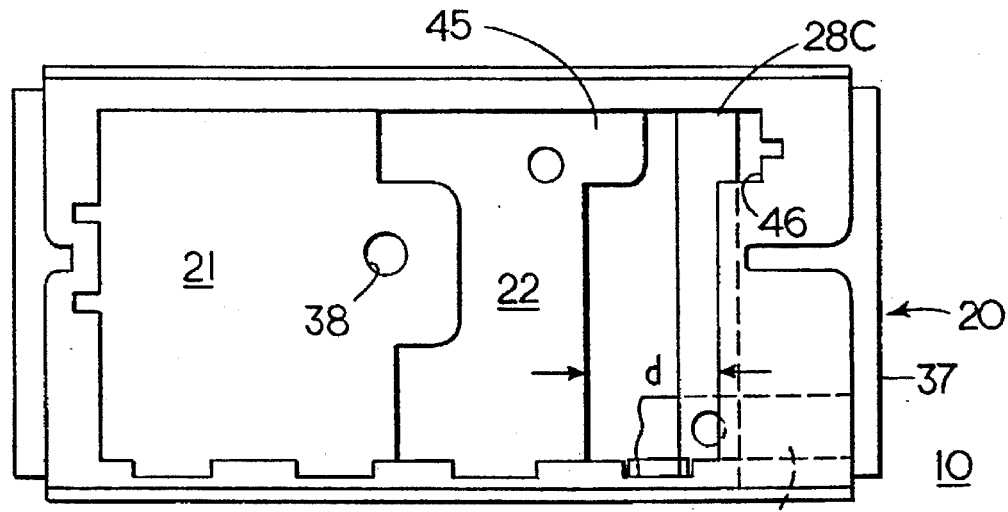

The arrangement of the door 20 on the motor control center 10 with the panels 21, 22 in the closed position and thereby preventing access to the vertical phase busses 28A, 28B, 28C as well as the horizontal phase busses 27A, 27B, 27C is best seen by now referring to FIG. 3 where the motor control center is shown with the cover 24 of FIG. 1 removed. The horizontal phase busses carry current from the associated electrical distribution system and the vertical phase busses connect the horizontal phase busses with the associated electrical equipment within the motor controller unit. An important feature of the invention is that only one phase of the electrical distribution system can be accessed at any one time. As shown in FIG. 4A, the panels 21, 22 are at the far right of the door 20 within the motor controller unit 10 whereby the top tab extension 45 rests within the rectangular slot 46 and the left side of the opening 31 is exposed to allow access to the vertical bus 28A and the horizontal bus 27A for connection by means of the connector thru-holes as indicated at 43A. It is noted that the remaining vertical and horizontal busses are not accessible when the vertical and horizontal busses 28A, 27A are exposed. Referring now to the arrangement of FIG. 4B wherein the panels 21, 22 on the door 20 on the motor controller unit 10 are in the closed position with the left panel 21 at the left of the door, and the right panel 22 at the right thereof, whereby the central tab extension 44 on the left panel 21 overlaps a part of the right panel 22 and the corresponding panel thru-hole 41 in panel 21 overlaps the corresponding panel thru-hole 42 in panel 22. Access to the vertical bus 28C and horizontal bus 27C and the corresponding connector thru-holes 42B is made by means of the overlapping panel thru-holes 41 and 42, which are large enough to receive a fastening tool such as a socket wrench. It is noted that the vertical and horizontal busses for the other two phases are not accessible. In the motor controller unit 10 shown in FIG. 4C, the left panel 21 on the door 20 is at the left side of the door, and right panel 22 is displaced a distance d from the edge of the right side 37 of the door 20. The top tab extension 45 is away from the slot 46 to thereby expose the vertical bus 28B and the horizontal bus 27C for connecting them together by means of the connector thru-holes 43C, without exposing any of the vertical or horizontal busses for the remaining phases. When each of the A, B, C phases are connected, the panels 21, 22 are displaced back to the position shown in FIG. 3 where none of the phase conductors are exposed as a safe operating condition.

A motor controller unit of the type containing motor starters and short circuit protection devices within a metallic enclosure has been described therein. A cabinet at the top of the enclosure that houses the phase conductors is provided with a pair of plastic panels that are arranged to only access the conductors within one of the phases at a time for access to the internal wiring and for connection and disconnection with the separate phase conductors.

We claim:

1. A motor controller unit comprising:
   an enclosure having a plurality of separate compartments;
   electrical components within one of said compartments;
   a cabinet at a top of said enclosure, said cabinet containing separate electrical phase conductors and defining an opening for access to said phase conductors; and
   an electrically-insulative door on said cabinet covering said access opening, said door comprising a pair first and second electrically-insulative panels on an electrically-insulative frame, said frame comprising a top plate, a bottom rail and a pair of opposing side pieces, said bottom rail includes front and rear support tabs receiving therebetween a bottom edge of said first and second panels.

2. The motor controller unit of claim 1 wherein a top edge of said first and second panels is trapped behind said top plate and a top part of said cabinet.

3. The motor controller unit of claim 1 wherein said first panel includes a central tab extension on one end and further includes a first panel thru-hole formed in said first panel.

4. The motor controller unit of claim 3 wherein said second panel includes a top tab extension on one end.

5. The motor controller unit of claim 4 wherein said first and second panels include a closed-ended insert for providing digital access to an operator for moving said first and second panels along said bottom rail.

6. The motor controller unit of claim 3 wherein said frame includes a rectangular slot in one of said opposing side pieces.

7. The motor controller unit of claim 4 wherein said phase conductors comprise phase A, phase B and phase C vertical busses.

8. The motor controller unit of claim 7 wherein said phase A vertical bus is accessible when said first and second panels are both displaced to one side of said door.

9. The motor controller unit of claim 7 wherein said phase C vertical bus is accessible when said first panel is displaced to one side of said door and said second panel is displaced to an opposite side of said door.

10. The motor controller unit of claim 9 wherein said first panel thru-hole and said second panel thru-hole overlap to provide access to said phase C vertical bus.

11. The motor controller unit of claim 7 wherein said phase B vertical bus is accessible when first panel is displaced to one side of said door and said second panel is displaced a predetermine distance from and opposite end of said door.

* * * * *